United States Patent
Burcea

(10) Patent No.: US 9,031,811 B2
(45) Date of Patent: May 12, 2015

(54) SYSTEM AND METHOD FOR PULSE-ECHO RANGING

(75) Inventor: George Burcea, Ajax (CA)

(73) Assignee: Siemens Aktiengesellschaft, Munich (DE)

( * ) Notice: Subject to any disclaimer, the term of this patent is extended or adjusted under 35 U.S.C. 154(b) by 474 days.

(21) Appl. No.: 13/276,034

(22) Filed: Oct. 18, 2011

(65) Prior Publication Data

US 2012/0095726 A1   Apr. 19, 2012

(30) Foreign Application Priority Data

Oct. 19, 2010 (EP) .................................... 10187982

(51) Int. Cl.
*G01C 9/00*    (2006.01)
*G01S 7/282*   (2006.01)
*G01S 7/285*   (2006.01)
*G01S 13/10*   (2006.01)

(52) U.S. Cl.
CPC .................. *G01S 7/282* (2013.01); *G01S 7/285* (2013.01); *G01S 13/103* (2013.01)

(58) Field of Classification Search
CPC ........................... G01F 23/284; G01F 23/2962
USPC ........ 702/159, 150; 367/99; 342/24, 124, 137
See application file for complete search history.

(56) References Cited

U.S. PATENT DOCUMENTS

| | | | |
|---|---|---|---|
| 6,137,438 A * | 10/2000 | McEwan | 342/134 |
| 6,597,309 B1 * | 7/2003 | Panton et al. | 342/134 |
| 7,379,016 B1 | 5/2008 | McEwan | |
| 7,482,971 B2 | 1/2009 | Lyon | |
| 7,633,434 B2 | 12/2009 | Serban | |
| 7,710,314 B2 | 5/2010 | Benari et al. | |
| 2006/0274871 A1 | 12/2006 | Griessbaum | |
| 2008/0024145 A1 * | 1/2008 | Schultheiss et al. | 324/644 |
| 2009/0085799 A1 | 4/2009 | Serban | |
| 2009/0189800 A1 * | 7/2009 | Benari et al. | 342/134 |
| 2009/0212997 A1 * | 8/2009 | Michalski | 342/137 |
| 2010/0019953 A1 | 1/2010 | Burcea | |
| 2010/0201408 A1 | 8/2010 | Burcea | |
| 2011/0029280 A1 * | 2/2011 | Beckhoven et al. | 702/159 |

FOREIGN PATENT DOCUMENTS

| | | |
|---|---|---|
| EP | 1770409 A1 * | 4/2007 |
| EP | 2 151 699 | 2/2010 |
| JP | 2009-047505 | 3/2009 |

\* cited by examiner

*Primary Examiner* — Michael Nghiem
*Assistant Examiner* — Eman Alkafawi
(74) *Attorney, Agent, or Firm* — Cozen O'Connor

(57) ABSTRACT

A pulse-echo ranging system and method wherein transmit burst pulses are transmitted to a target at a first repetition frequency, an intermediate frequency signal is generated by sampling the received echo pulses from the target at a second repetition frequency slightly lower than the first repetition frequency, and the intermediate frequency signal is evaluated to determine the target distance. In order to compensate for phase error and thermal drift which may occur when the transmit and sampling instants are generated, the transmit burst pulses are periodically and alternately transmitted at the first and second repetition frequencies while the received echo pulses are simultaneously sampled at the second and first repetition frequencies, and the target distance is determined as half of the distance between echoes appearing in the intermediate frequency signal and resulting from the different clocks.

5 Claims, 4 Drawing Sheets

SYSTEM AND METHOD FOR PULSE-ECHO RANGING

BACKGROUND OF THE INVENTION

1. Field of the Invention

The present invention relates to pulse-echo ranging and more particularly, to a pulse-echo ranging system comprising a first clock generator for generating a first clock at a first clock frequency, a second clock generator for generating a second clock at a second clock frequency slightly lower than the first clock frequency, a burst generator triggered by the first clock for generating burst pulses at the first clock frequency and for conveying the burst pulses to be transmitted to a target, a receiving device triggered by the second clock for generating an intermediate frequency signal by sampling echo pulses reflected from the target at the second clock frequency, and a signal processing device configured to evaluate the intermediate frequency signal to determine the target distance.

The invention further relates to a pulse-echo ranging method comprising transmitting transmit burst pulses to a target at a first repetition frequency, receiving echo pulses reflected from the target, generating an intermediate frequency signal by sampling the received echo pulses at a second repetition frequency slightly lower than the first repetition frequency, and evaluating the intermediate frequency signal to determine the target distance.

2. Description of the Related Art

Pulse-echo ranging systems and methods are known from each of U.S. Pat. No. 7,379,016 B1, U.S. Pat. No. 7,482,971 B2, U.S. Pat. No. 7,633,434 B2, U.S. Pat. No. 7,710,314 B2 and US 2010/0201408 A1.

Pulse-echo ranging systems, such as radar, Time Domain Reflectometry (TDR) or laser ranging systems provide distance or level measurements based on the direct measurement of the running time of microwave or light pulses transmitted to and reflected from a target, e.g., the surface of a fill material in a container.

As the running time for distances of a few meters is in the nanosecond range, a special time transformation procedure is required to enable these short time periods to be measured. Here, the microwave or light pulses are transmitted to the target at a repetition rate or transmit clock frequency that is established by a transmit clock generator. The received echo pulses reflected from the target are sampled at a sampling clock frequency that is slightly lower than the transmit clock frequency. The sampling and a subsequent integration or low-pass filtering leads to an intermediate frequency signal corresponding to the received echo pulses but time-expanded relative thereto by a factor $T1/(T1-T2)$, where $T1$ is the transmit pulse repetition period and $T2$ is the sampling period. The time-expansion allows for amplifying, digitizing and further processing of the echo pulses with standard techniques.

Providing the transmit clock frequency and the sampling clock frequency requires a time base having a very fine resolution, high accuracy, linearity and stability, because these factors are directly related to the measurement error.

A digital time base generator having two clock signal generators of slightly different frequencies can benefit from the use of crystal oscillators and phase-locked loop (PLL) circuits that allows the attainment of high accuracy and low jitter. However, during start up of the crystal oscillators, the phase difference between the clock signals is not predictable. If a detector for a zero phase delay is used, the detector must be able to operate in the picoseconds range. Zero phase detector errors may diminish the merits of the digital solution and the measurement time is increased because a waiting time for zero phase detection has to be added.

It is known from U.S. Pat. No. 7,633,434 B2 that the received echo pulses may be sampled in a signal mixer by cross-correlation with sampling pulses having the same shape as the transmitted burst pulses and at the sampling clock frequency slightly lower than the transmit clock frequency. As a result, two pulse shapers are provided for shaping the transmit burst and sampling pulses. Consequently, there may be a significant measurement drift created by different variations over temperature of the propagation delay in the transmit and sampling pulse shapers.

As known from U.S. Pat. No. 7,482,971 B2 or U.S. Pat. No. 7,710,314 B2, the thermal drift can be corrected by switching the transmit pulse into a reference delay. However, this known solution is complex and the additional microwave switch affects the measurement signal.

SUMMARY OF THE INVENTION

It is therefore an object of the invention to provide a system and method that overcome the prior art drawbacks and compensates for phase error and thermal drift between the transmit and sampling instants.

These and other objects and advantages are achieved in accordance with the invention by a pulse-echo system in which a switching device is arranged between first and second clock generators, on the one hand, and the burst generator and receiving device on the other, where the switching device is configured to periodically and alternately provide each of the first and second clocks to each of the burst generator and receiving device. The pulse-echo system also includes a signal processing device that is configured to calculate the target distance as half of the distance between echoes appearing in an intermediate frequency signal and resulting from the different clocks.

The object of the invention is also achieved by a pulse-echo method in which the transmit burst pulses at the first and second repetition frequencies are periodically and alternately transmitted while simultaneously sampling the received echo pulses at the second and first repetition frequencies, and a target distance is determined as half of the distance between echoes appearing in an intermediate frequency signal and resulting from the first and second clocks.

In known systems and methods, the first clock frequency is the transmit clock frequency and the slightly lower second clock frequency is the sampling clock frequency. Therefore, the echo pulses are sampled in the forward-in-time direction, which generates time-expanded echoes having a positive time delay with respect to the coincidence moment (i.e., zero delay).

In accordance with an embodiment of the invention, the transmit and sampling clock frequencies are periodically switched between the first clock frequency and the slightly lower second clock frequency. As a result, the echo pulses are alternately sampled in the forward-in-time direction and a backward-in-time direction, which provides both time-expanded echoes having a positive time delay and time-expanded echoes having a negative time delay with respect to the coincidence moment. Here, the positive and negative time delay are equal. As a result, the time of flight or physical distance to the target is half of the distance between the positively and negatively delayed echoes so that no coincidence (i.e., zero phase) detection is necessary.

In addition, any difference in delay or drift of the first and second clocks in the signal paths between the clock generators and the switching device is eliminated because the drift will affect both the transmit pulses and the sampling pulses. Therefore, the distance between the positively and negatively delayed echoes will remain constant.

As is known from the above-mentioned U.S. Pat. No. 7,633,434 B2, the received echo pulses may be sampled by cross-correlation, for which purpose the receiving device may comprise a further burst generator triggered by the second clock for generating sampling pulses and a signal mixer for generating the intermediate frequency signal by mixing the echo pulses with the sampling pulses. In principle, it is possible to directly trigger the burst generators by the first and second clocks to generate rectangular transmit and sampling pulses. However, a smoother pulse shape is usually preferred. As a result, the rectangular clocks may be fed by pulse shapers to the burst generators. In this case, and in accordance with a preferred embodiment of the invention, the pulse shapers are arranged between the respective clock generators and the switching device so that any thermal drift introduced by the variation of the delay of the pulse shapers is eliminated.

In accordance with the disclosed embodiments, the switching device operates at a switching frequency which may be, in the simplest case, half the first clock frequency. Alternately, the first and second clock signals may be only switched once per measurement cycle, i.e., the switching frequency may be half the first clock frequency divided by the time-expansion factor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now further described by way of example and with reference to the accompanying drawing, in which.

DETAILED DESCRIPTION OF THE PREFERRED EMBODIMENTS

In the figures, like reference numbers indicate similar elements or signals.

Figure 1:
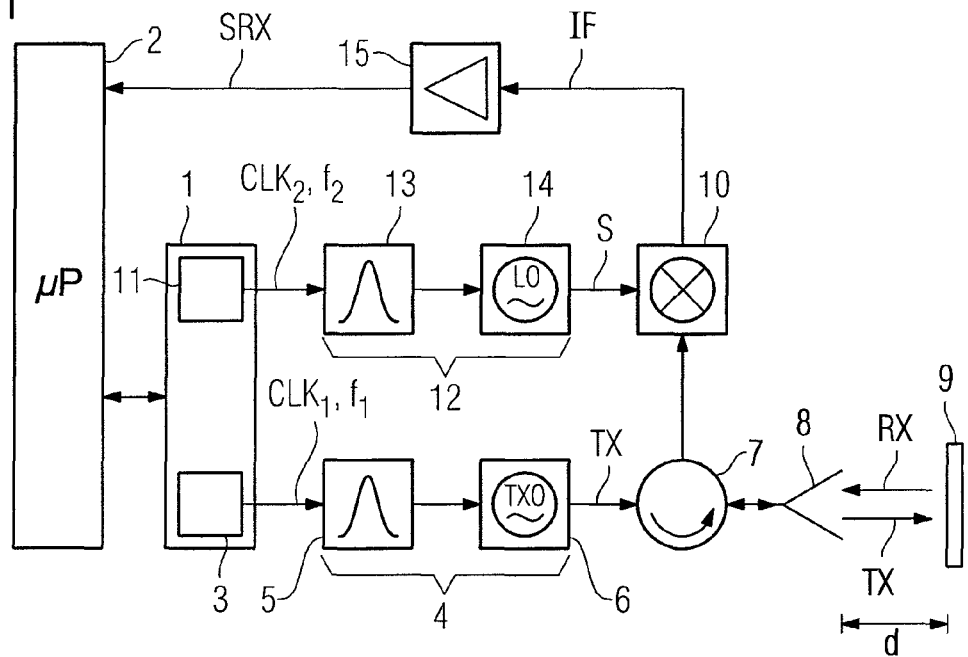
FIG. 1 is a schematic block diagram of a prior art pulse-echo radar ranging system.

With specific reference to FIG. 1, which shows basic components of a prior art pulse-echo radar ranging system, a time base control circuit 1, which is under control of a microcontroller 2, contains a transmit clock generator 3 for generating a transmit clock $CLK_1$ at a transmit clock frequency $f_1$ in the MHz range. The transmit clock $CLK_1$ triggers a transmit pulse generator 4 comprising a pulse shaper 5 and a first microwave oscillator 6 for generating microwave transmit pulses TX with a pulse repetition rate equal to the transmit clock frequency $f_1$. The transmit pulses TX may be obtained by modulating the microwave oscillator 6 or gating continuous oscillation of the microwave oscillator 6 and may have a duration of 1 ns and a frequency in the GHz range. The transmit pulses TX are transmitted through a directional coupler (hybrid) 7 and an antenna 8 to a target 9, such as the surface of a fill material in a container. The target 9 reflects the transmit pulses TX back as echo pulses RX, which are received by either the same antenna 8 or a separate antenna (not shown). The received echo pulses RX are passed through the directional coupler 7 to a signal mixer 10. The time base control circuit 1 further contains a sampling clock generator 11 for generating a sampling clock $CLK_2$ at a sampling clock frequency $f_2$ that is slightly lower than the transmit clock frequency $f_1$, e.g., by a few Hz or kHz.

The sampling clock $CLK_2$ triggers a sampling pulse generator 12 comprising a pulse shaper 13 and a second microwave oscillator (local oscillator) 14 for generating sampling pulses S of the same shape as the transmit pulses TX and with a pulse repetition rate equal to the sampling clock frequency $f_2$. The signal mixer 10 generates an intermediate frequency signal or down-converted signal IF by multiplying the received echo pulses RX by the sampling pulses S. As the pulse repetition rate of the sampling pulses S is slightly lower than that of the transmit pulses TX, the sampling pulses S will sweep in small increments per measuring cycle over the transmit or echo pulse interval so that the received echo pulses RX are sampled by cross-correlation with the sampling pulses S.

The cross-correlation and subsequent integration and amplification by an IF amplifier 15 lead to a signal SRX that is expanded in time, in shape and corresponds to the received echo pulses RX. This signal SRX is further processed in the microcontroller 2 to determine the running time of the transmit pulses TX to the target 9 and thus the distance d of the target 9 from the antenna 8.

Figure 2:
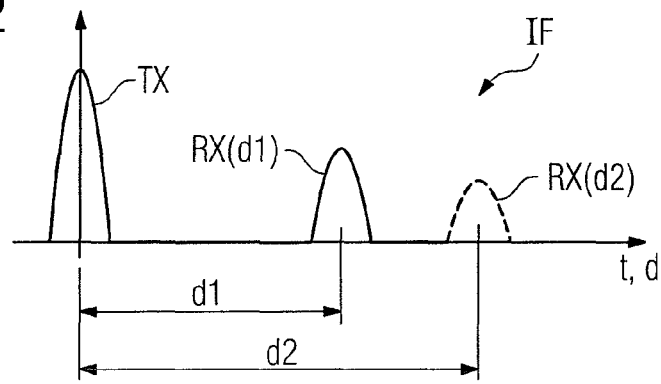
FIG. 2 is graphical plot of a timing diagram showing transmit and echo pulses in the prior art system of FIG. 1.

FIG. 2 is a graphical plot of a timing diagram of the transmit pulses TX and echo pulses RX (i.e., the down-converted signal IF) for two different distances d1 and d2. The down-converted signal IF only appears when an echo pulse RX reaches the mixer 10 at the same time as a sampling pulse S, i.e., the delay of signal S (or $CLK_2$) relative to signal TX (or $CLK_1$) equals the propagation delay of TX to the target 9 and back.

Figure 3:
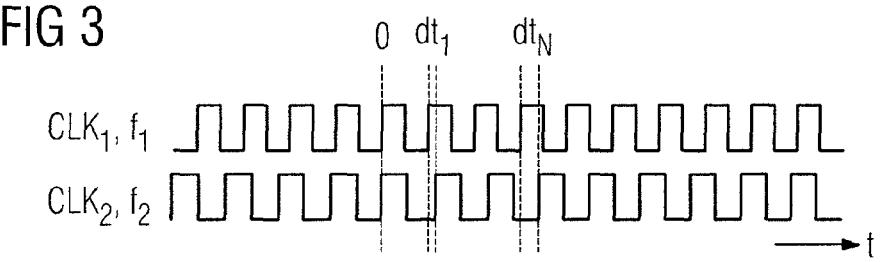
FIG. 3 is a graphical plot of a timing diagram showing first and second clocks generated by a time base generator of the prior art system of FIG. 1.

FIG. 3 is a graphical plot of the first clock $CLK_1$ and second clock $CLK_2$ having slightly different frequencies $f_1$ and $f_2$, ($f_1>f_2$). FIG. 3 further shows the variation of the time delay between the rising edges of clocks $CLK_1$ and $CLK_2$ and marks a zero delay 0, the minimum step (increment, resolution) of the delay $dt_1=1/f2-1/f1$ and a cumulated delay $dt_N=N\cdot(1/f2-1/f1)$ after N pulses. However, when the two clock generators 3, 11 initially start up, the phase difference between the clock $CLK_1$ and $CLK_2$ is not predictable. It is also easy to understand that different delays in the pulse shapers 5, 13, e.g., due to the different temperature drifts, lead to further phase shift between the transmit pulses TX and sampling pulses S and thus increase the measurement error.

Figure 4:
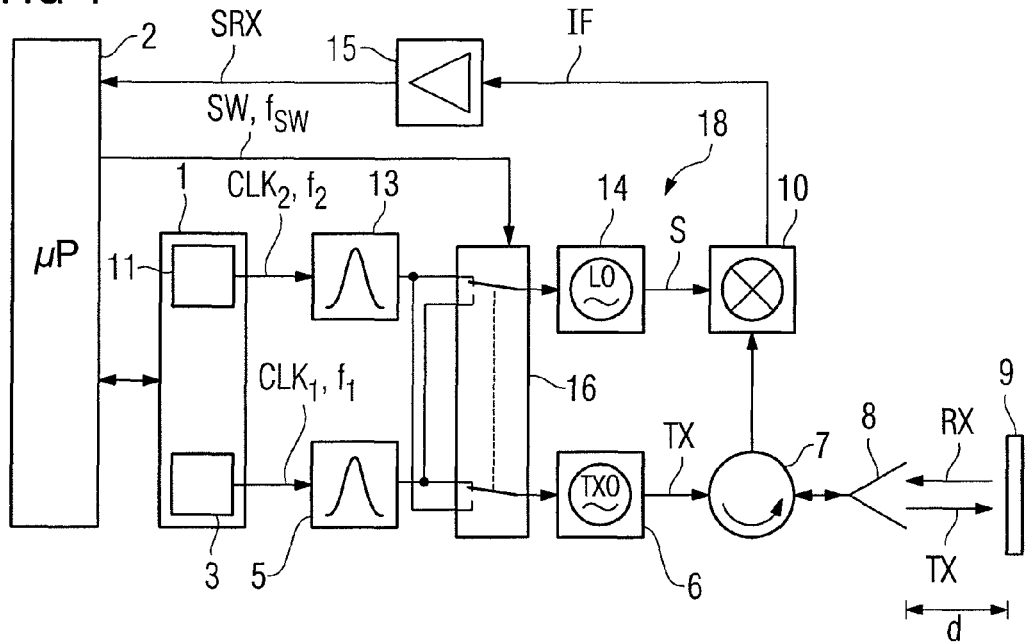
FIG. 4 is a schematic block diagram of a pulse-echo radar ranging system in accordance with the invention.

FIG. 4 is a schematic block diagram of a pulse-echo ranging system in accordance with the invention. The system of FIG. 4 differs from that of FIG. 1 in that a switching device 16 is arranged between the first and second pulse shapers 5, 13 and the first and second oscillators 6, 14. The switching device 16 is controlled by a control signal SW from the microcontroller 2 and periodically and alternately connects each of the first and second pulse shapers 5, 13 to each of the first and second oscillators 6, 14 with a switching frequency $f_{SW}$. Thus, the transmit and sampling clock generators 3 and 11 of FIG. 1 alternately, simultaneously serve the dual role of providing the transmit and sampling clock frequencies. In a first one of two switching positions of the switching device 16, the transmit pulses TX are generated with pulse repetition rate $f_1$ and the sampling pulses S are generated with pulse repetition rate $f_2$. In the second switching position, the transmit pulses TX are generated with pulse repetition $f_2$ and the sampling pulses S are generated with pulse repetition rate $f_1$.

Figure 5:
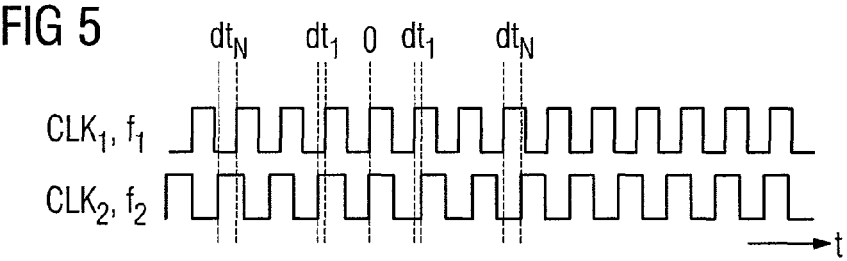
FIG. 5 is a graphical plot of a timing diagram showing first and second clocks generated by a time base generator of the system of FIG. 4.

Similarly to FIG. 3, FIG. 5 shows the first and second clocks $CLK_1$ and $CLK_2$. It can be seen here that when the first clock $CLK_1$ is the transmit clock and the second clock $CLK_2$ the sampling clock, the rising edges of the sampling clock $CLK_2$ sweep in the forward-in-time direction over the transmit clock $CLK_1$. As result, the received echo pulses RX are sampled in the forward-in-time direction.

When the opposite direction, the second clock $CLK_2$ is the transmit clock and the first clock $CLK_1$ the sampling clock. Here, the second clock $CLK_2$ is the transmit clock and the first clock $CLK_1$ the sampling clock, the rising edges of the sampling clock $CLK_1$ sweep in the backward-in-time direction over the transmit clock $CLK_2$. As result, the received echo pulses RX are sampled in the backward-in-time direction.

As the transmit and sampling clock frequencies are periodically switched between the first and second clock frequencies $CLK_1$ and $CLK_1$, the echo pulses RX are sampled in the positive and the negative direction with the same sampling width $dt=dt_1$.

Figure 6:
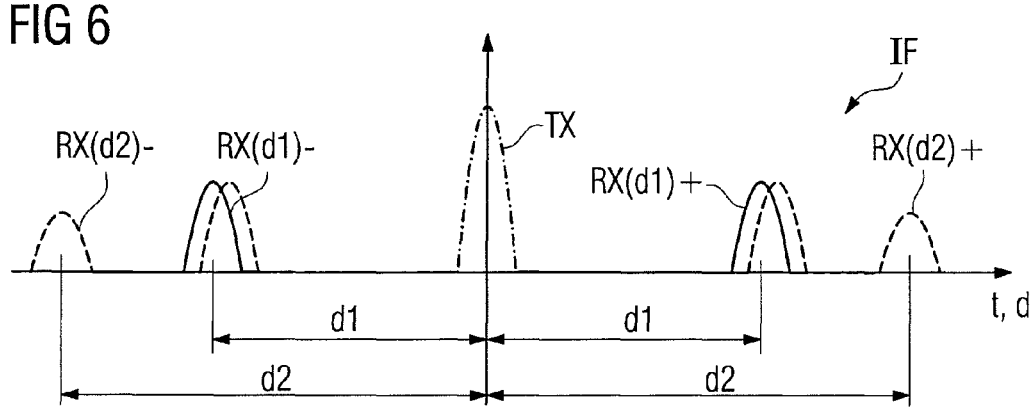
FIG. 6 is a graphical plot of a timing diagram showing echo pulses in the system of FIG. 4.

FIG. 6 is a graphical plot of the down-converted signal IF for two different distances d1, d2 of the target 9. The signal comprises two down-converted echoes, e.g., RX(d1)+ and RX(d1)− for each distance, e.g., d1. The two echoes RX(d1)+ and RX(d1)− appear symmetrically placed about the transmit pulse TX, which represents the coincidence moment 0 (see FIG. 5). Thus, the transmit pulse TX or coincidence moment 0 are no longer needed to determine the distance d1, which is now calculated in the microcontroller 2 as half of the distance between the two echo pulses RX(d1)+ and RX(d1)−.

As indicated by the dotted lines, any difference in delay or drift in the transmit and sampling pulse shapers 5, 13 will affect the two echo pulses RX(d1)+ and RX(d1)− in the same direction, because each pulse shaper 5, 13 forms part of both the transmit channel and the sampling channel. If d1 "negative" decreases then d1 "positive" increases and the distance between the echo pulses RX(d1)+ and RX(d1)− remains constant.

Figure 7:
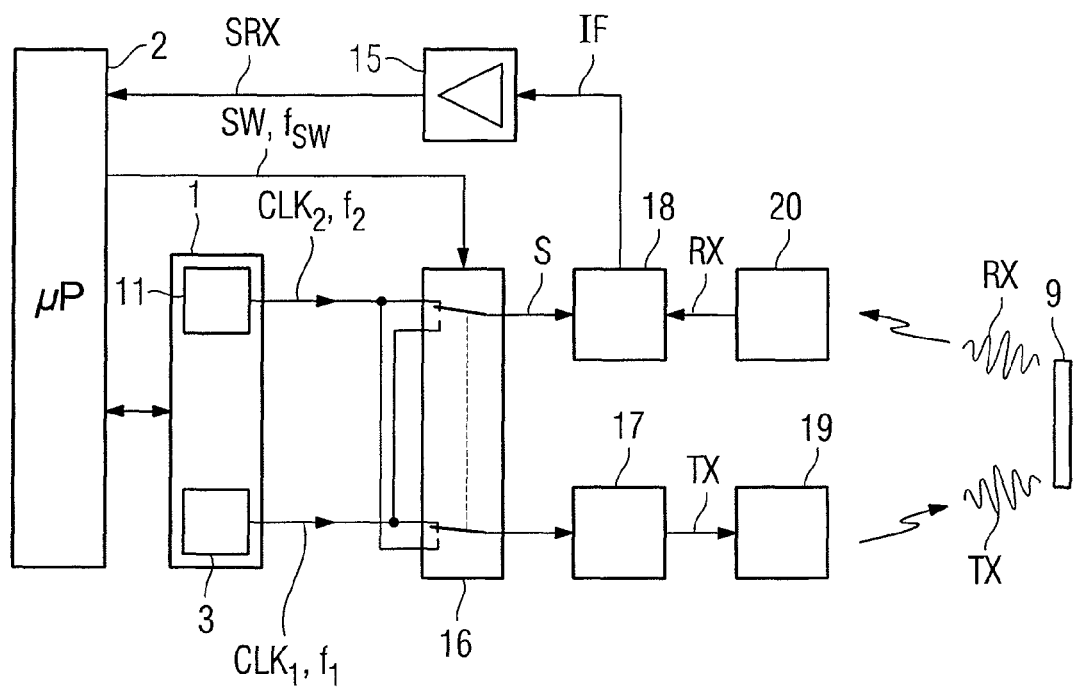
FIG. 7 shows an exemplary block diagram of a more generalized embodiment of a pulse-echo ranging system in accordance with the invention.

FIG. 7 is an exemplary schematic block diagram of a more generalized embodiment of the pulse-echo ranging system in accordance with the invention. Here, the time base control circuit 1 is under control of the microcontroller 2 and contains the first clock generator 3 for generating the first clock $CLK_1$ at the first clock frequency $f_1$ and the second clock generator 11 for generating the second clock $CLK_2$ at the second clock frequency $f_2$. The first and second clock generators 3 and 11 are supplied through the switching device 16 connected to a burst generator 17 and a receiving device 18.

When triggered by either the first or second clock $CLK_1$ or $CLK_2$, the burst generator 17 generates burst pulses TX at the respective clock frequencies $f_1$ or $f_2$. The burst pulses TX are transmitted by a transmitting transducer 19 to the target 9. The transmitting transducer 19 may be an antenna for microwave radiation, as shown in FIG. 4, or an optical device such as a laser or LED. The radiated pulses TX each include a predetermined number of microwave cycles or light modulation cycles. The echo pulses RX from the target 9 are received by a receiving transducer 20 which can be the same (see FIG. 4), another antenna, or an optical element such as a photodetector. The received echo pulses RX are sampled by the receiving device 18 to generate the intermediate frequency signal IF. In the particular case of FIG. 4, where the received echo pulses RX are sampled by cross-correlation, the receiving device 18 is formed by the signal mixer 10 and the second oscillator 14.

Figure 8:
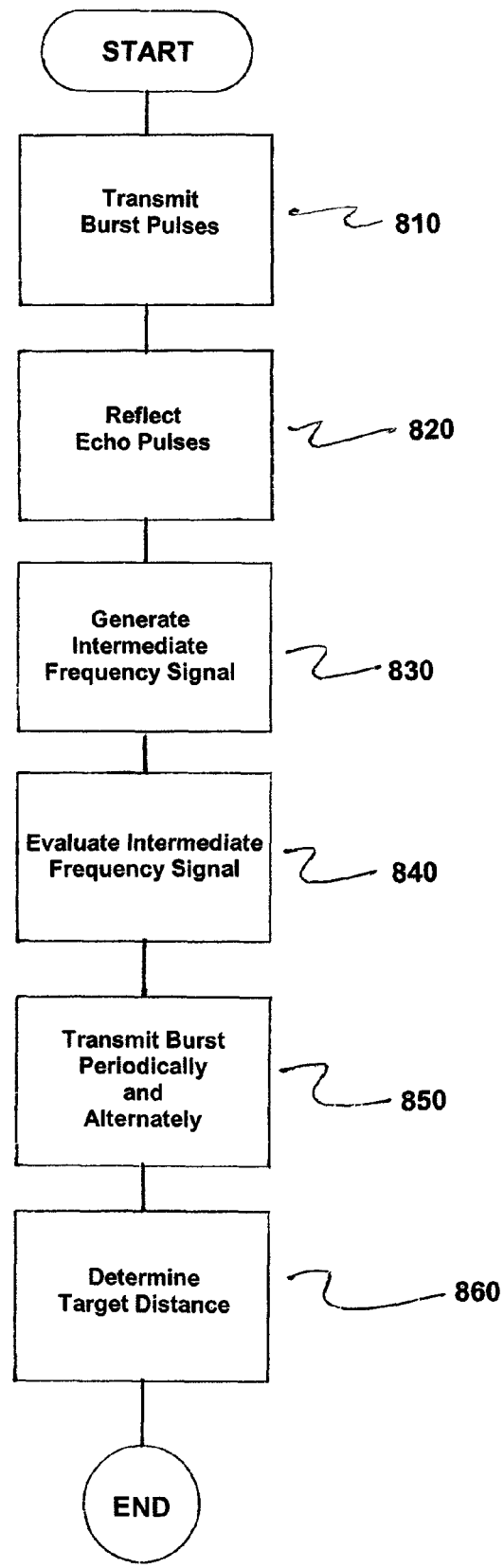
FIG. 8 is a flowchart of a method in accordance with an embodiment of the invention.

FIG. 8 is a flow chart of a method for pulse-echo ranging. The method comprises transmitting, by a burst generator, transmit burst pulses (TX) to a target (9) at a first repetition frequency ($f_1$), as indicated in step 810. Echo pulses (RX) reflected from the target (9) are received at a receiving device, as indicated in step 820.

An intermediate frequency signal (IF) is generated by sampling the received echo pulses (RX) at a second repetition frequency ($f_2$) slightly lower than the first repetition frequency ($f_1$), as indicated in step 830. The intermediate frequency signal (IF) is evaluated to determine the target distance (e.g. d1), as indicate in step 840.

The transmit burst pulses (TX) are transmitted periodically and alternately at the first and second repetition frequencies ($f_1$, $f_2$) while simultaneously sampling the received echo pulses (RX) at the second and first repetition frequencies ($f_2$, $f_1$), as indicated in step 850.

The target distance (d1) is determined at a signal processing device as half of the distance between echoes (RX(d1)+ and RX(d1)−) appearing in the intermediate frequency signal (IF) and resulting from the first and second clocks ($CLK_1$, $CLK_2$), as indicated in step 860.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pulse-echo ranging system comprising:
a first clock generator configured to generate a first clock at a first clock frequency;
a second clock generator configured to generate a second clock at a second clock frequency that is lower than the first clock frequency;
a burst generator triggered by one of the (i) first clock or (ii) the second clock to generate burst pulses at the first clock frequency or the second clock frequency and configured to convey the burst pulses to be transmitted to a target;
a receiving device triggered by one of (i) the first clock or (ii) the second clock to generate an intermediate frequency signal by sampling echo pulses reflected from the target at one of (i) the first clock frequency or (ii) the second clock frequency; and a signal processing device configured to evaluate the intermediate frequency signal to determine the target distance;

a switching device arranged between (i) the first and second clock generators at one side and (ii) the burst generator and the receiving device at another side;

wherein the switching device is configured to periodically and alternately provide each of the first and second clocks to each of the burst generator and receiving device such that (i) the burst generator is triggered by the first clock while at the same time the receiving device is triggered by the second clock and such that (ii) the burst generator is triggered by the second clock while at the same time the receiving device is triggered by the first clock; and wherein the signal processing device is configured to calculate the target distance as half of the distance between echoes and appearing in an intermediate frequency signal and resulting from the first and second clocks.

2. The pulse-echo ranging system of claim 1, wherein the receiving device comprises:

a further burst generator triggered by the second clock to generate sampling pulses; and a signal mixer configured to generate the intermediate frequency signal by mixing the echo pulses with the sampling pulses.

3. The pulse-echo ranging system of claim 2, further comprising:

first and second pulse shapers configured to shape the transmit burst pulses and sampling pulses, the first pulse shaper being arranged between the first clock generator and the switching device and the second pulse shaper being arranged between the second clock generator and the switching device.

4. A method for pulse-echo ranging, comprising:

transmitting, by a burst generator, transmit burst pulses to a target at a first repetition frequency;

receiving, at a receiving device, echo pulses reflected from the target;

generating an intermediate frequency signal by sampling the received echo pulses reflected from the target at a second repetition frequency lower than the first repetition frequency;

evaluating the intermediate frequency signal to determine the target distance;

transmitting, periodically and alternately, the transmit burst pulses at the first and second repetition frequencies such that (i) the burst generator is triggered by the first clock while at the same time the receiving device is triggered by the second clock and such that (ii) the burst generator is triggered by the second clock while at the same time the receiving device is triggered by the first clock while simultaneously sampling the received echo pulses at the second and first repetition frequencies, respectively; and determining, at a signal processing device, the target distance as half of the distance between echoes and appearing in the intermediate frequency signal and resulting from the first and second clocks.

5. The method of claim 4, wherein the received echo pulses are sampled by mixing the echo pulses with sampling pulses of the second repetition frequency and of a same shape as the transmit burst pulses.

\* \* \* \* \*